United States Patent
Han et al.

(10) Patent No.: US 10,129,608 B2
(45) Date of Patent: Nov. 13, 2018

(54) DETECT SPORTS VIDEO HIGHLIGHTS BASED ON VOICE RECOGNITION

(71) Applicant: Zepp Labs, Inc., Los Gatos, CA (US)

(72) Inventors: Zheng Han, Beijing (CN); Xiaowei Dai, Beijing (CN); Jiangyu Liu, Beijing (CN)

( * ) Notice: Subject to any disclaimer, the term of this patent is extended or adjusted under 35 U.S.C. 154(b) by 191 days.

(21) Appl. No.: 14/629,852

(22) Filed: Feb. 24, 2015

(65) Prior Publication Data
US 2016/0247328 A1     Aug. 25, 2016

(51) Int. Cl.
| | | |
|---|---|---|
| H04N 7/18 | (2006.01) | |
| H04N 21/845 | (2011.01) | |
| H04N 21/439 | (2011.01) | |
| G11B 27/28 | (2006.01) | |
| H04N 21/8549 | (2011.01) | |

(52) U.S. Cl.
CPC ......... *H04N 21/8456* (2013.01); *G11B 27/28* (2013.01); *H04N 21/4394* (2013.01); *H04N 21/8549* (2013.01)

(58) Field of Classification Search
CPC ........... H04N 21/4394; H04N 21/8456; H04N 21/44004; H04N 21/8549; G11B 27/28
USPC .................. 348/157; 382/159, 190; 463/31; 700/94; 715/723
See application file for complete search history.

(56) References Cited

U.S. PATENT DOCUMENTS

| | | |
|---|---|---|
| 5,610,590 A | 3/1997 | Johnson et al. |
| 5,819,206 A | 10/1998 | Horton et al. |
| 6,224,493 B1 | 5/2001 | Lee et al. |
| 7,978,081 B2 | 7/2011 | Shears et al. |
| 8,109,816 B1 | 2/2012 | Grober |

(Continued)

FOREIGN PATENT DOCUMENTS

| | | |
|---|---|---|
| JP | 2012-090337 A | 5/2012 |
| KR | 10-0792016 B1 | 1/2008 |
| KR | 10-2012-0098211 A | 9/2012 |

OTHER PUBLICATIONS

Allen, R., "Wireless Sensor Architecture Uses Bluetooth Standard" Electronic Design, Aug. 7, 2000, 5 Pages, Can be retrieved from <URL:http://electronicdesign.com/communications/wireless-sensor-architecture-uses-bluetooth-standard>.

(Continued)

*Primary Examiner* — Y Lee
*Assistant Examiner* — Richard Carter
(74) *Attorney, Agent, or Firm* — Young Basile Hanlon & MacFarlane, P.C.

(57) ABSTRACT

A solution is provided for detecting video highlights of a sports video. A video highlight of a sports video is a portion of the sports video and represents a semantically important event captured in the sports video. An audio stream associated with the sports video is evaluated, e.g., the loudness and length of the loudness of the portions of the audio stream. Video segments of the sports video are selected based on the evaluation of the audio stream. Each selected video segment represents a video highlight candidate of the sports video. A trained audio classification model is used to recognize the voice patterns in the audio stream associated with each selected video segment. Based on the comparison of the recognized video patterns with a set of desired voice patterns, one or more video segments are selected as the video highlights of the sports video.

22 Claims, 11 Drawing Sheets

(56) References Cited

U.S. PATENT DOCUMENTS

| | | | |
|---|---|---|---|
| 8,282,487 B2 | 10/2012 | Wilson et al. | |
| 8,337,335 B2 | 12/2012 | Dugan | |
| 8,409,024 B2 | 4/2013 | Marty et al. | |
| 8,409,025 B2 | 4/2013 | Stites et al. | |
| 8,449,402 B2 | 5/2013 | Jaekel et al. | |
| 8,523,696 B2 | 9/2013 | Kamino et al. | |
| 8,589,114 B2 | 11/2013 | Papadourakis | |
| 8,593,286 B2 | 11/2013 | Razoumov et al. | |
| 8,903,521 B2 | 12/2014 | Goree et al. | |
| 8,905,855 B2 | 12/2014 | Fitzpatrick et al. | |
| 8,923,607 B1 * | 12/2014 | Kwatra | G06K 9/00724 382/159 |
| 8,941,723 B2 | 1/2015 | Bentley et al. | |
| 8,944,928 B2 | 2/2015 | Kaps et al. | |
| 8,956,238 B2 | 2/2015 | Boyd et al. | |
| 9,039,527 B2 | 5/2015 | Bentley et al. | |
| 2002/0176689 A1 | 11/2002 | Heo et al. | |
| 2004/0167767 A1 * | 8/2004 | Xiong | G10L 25/00 704/1 |
| 2005/0032582 A1 | 2/2005 | Mahajan et al. | |
| 2005/0272516 A1 | 12/2005 | Gobush | |
| 2006/0025229 A1 | 2/2006 | Mahajan et al. | |
| 2006/0166738 A1 | 7/2006 | Eyestone et al. | |
| 2007/0250777 A1 * | 10/2007 | Chen | G10L 25/00 715/723 |
| 2008/0085778 A1 | 4/2008 | Dugan | |
| 2008/0300700 A1 * | 12/2008 | Hammer | H04R 29/00 700/94 |
| 2009/0048044 A1 | 2/2009 | Oleson et al. | |
| 2009/0060342 A1 * | 3/2009 | Chiang | G06K 9/00711 382/190 |
| 2010/0103269 A1 | 4/2010 | Wilson et al. | |
| 2010/0144414 A1 | 6/2010 | Edis et al. | |
| 2010/0323794 A1 | 12/2010 | Su | |
| 2013/0304820 A1 | 11/2013 | Vasquez et al. | |
| 2014/0349750 A1 * | 11/2014 | Thompson | A63F 13/12 463/31 |

OTHER PUBLICATIONS

Arfwedson, H., et al., "Ericsson's Bluetooth Modules," Ericsson Review, 1999, No. 4, pp. 198-205, <URL:http://www.ericsson.com/ericsson/corpinfo/Pub.s/review/1999_04/files/19990404.pdf>.

Bishop, R., "LabVIEW 8 Student Edition," 2007, 12 pages, Pearson Prentice-Hall, Upper Saddle River, NJ.

First Annual "Better Golf Through Technology," Better Golf Through Technology Conference, Feb. 17-18, 2006, 1 page, [Archived on web.archive.org on Mar. 14, 2006] Can be Retrieved at <URL:https://web.archive.org/web/20060314063211/http://www.bettergolfthroughtechnology.com/>.

Home Page for "Concept2: Training," 1 page, [Archived on web.archive.org on Feb. 5, 2009] Can be Retrieved at <URL:http://web.archive.org/web/20090205092657/http://concept2.com/us/training/default.asp>.

Home Page for Expresso.com, 2 pages, [Archived on web.archive.org on Apr. 29, 2009] Can be Retrieved at <URL:http://web.archive.org/web/20090426023759/http://expresso.com/products_services/index.html#>.

Honan, M., "Apple unveils iPhone," Macworld, Jan. 89, 2007, 4 Pages, can be retrieved at <URL:http://www.macworld.com/article/1054769/iphone.html>.

Invensense, "InvenSense™ Unveils World's 1st IMU Solution for Consumer Appl.s" InvenSense, Apr. 6, 2010, 2 pages.

Kalia, M., et al., "Efficient Policies for Increasing Capacity in Bluetooth: An Indoor Pico-Cellular Wireless System," IBM India Research Laboratory, 2000, 5 pages.

Linx Technologies, "HP3 Series Transmitter Module Data Guide" Linx Technologies, Inc., 2008, Revised Jul. 27, 2011, 13 Pages.

Otto, C., et al., "System Architecture of a Wireless Body Area Sensor Network for Ubiquitous Health Monitoring," Journal of Mobile Multimedia, 2006, pp. 307-326, vol. 1, No. 4.

Rao, R., et al., "Demand-based Bluetooth Scheduling," Pennsyvania State University, Sep. 27, 2001, 13 pages, Can be retrieved at <URL:http://www.cse.psu.edu/~gik2/papers/Bluetooth1.doc>.

Roving Networks, "Blue Sentry RN-8005-CB Data Sheet," 2009, 1 page.

Sanders, K., "Japanese WII Price, Release Date Revealed," IGN US, Sep. 13, 2006, 1 Page, can be retrieved at <URL:http://www.ign.com/articles/2006/09/14/japanese-wii-price-release-date-revealed>.

Smartswing, "SmartSwing Introduces Affordable Intelligent Golf Club," Press Release, Jul. 19, 2005, 2 pages, [Archived on web.archive.org on Jun. 13, 2006] Can be Retrieved at <URL:https://web.archive.org/web/20060613114451/http://www.smartswinggolf.com/site/news/pr_2006_jan_23_aus.html>.

Solid State Technology, "MEMS Enable Smart Golf Clubs," Extension Media, Jan. 6, 2005, 3 pages,[Archived on web.archive.org on Jan. 15, 2016] Can be Retrieved at <URL:https://web.archive.org/web/20160115202844/http://electroiq.com/blog/2005/01/mems-enable-smart-golf-clubs/>.

Takahashi, D., "Facebook, Twitter, Last.fm coming to Xbox Live this fall" Venture Beat, Jun. 1, 2009, 5 Pages, Can be retrieved from <URL:http://venturebeat.com/2009/06/01/facebook-coming-to-xbox-live-as-microsoft-beefs-up-other-entertainment-on-xbox-360/>.

The iClub System™ "iClub.net—Contact," Fortescue Corp. 2001-2005, 1 Page, [Archived on web.archive.org on Apr. 9, 2005] Can be Retrieved at <URL:https://web.archive.org/web/20050409111624/http://www.iclub.net/contact.html>.

The iClub System™ "iClub.net—Products," Fortescue Corp. 2001-2005, 1 Page, [Archived on web.archive.org on Jul. 10, 2005] Can be Retrieved at <URL:https://web.archive.org/web/20050710075533/http://www.iclub.net/products-iclub.html.

The iClub System™ "iClub.net—Products ICLUB$^e$," Fortescue Corp. 2001-2005, 1 Page, [Archived on web.archive.org on Apr. 14, 2005] Can be Retrieved at <URL:https://web.archive.org/web/20050414233840/http://www.iclub.net/products-iclube.html.

The iClub System™ "iClub.net—Products ICLUB (Full Swing)," Fortescue Corp. 2001-2005, 1 Page, [Archived on web.archive.org on Apr. 14, 2005] Can be Retrieved at <URL:https://web.archive.org/web/20050414233828/http://www.iclub.net/products-iclub.html.

The iClub Product Brochure, 2001-2005, 2 pages.

Tuite, D., "Motion-Sensing MEMS Gyros and Accelerometers Are Everywhere," Electronic Design, Jul. 9, 2009, 6 pages, Can be retrieved from <URL:http://electronicdesign.com/analog/motion-sensing-mems-gyros-and-accelerometers-are-everywhere>.

Webster's New College Dictionary, Definition for "Virtual Reality," (3rd ed. 2008), 3 Pages.

Webpage for zigbees.com, 4 Pages, [online] [retrieved on Mar. 14, 2016] Can be retrieved at <URL:http://www.zigbees.com/h_start.htm>.

Wheeler, A, et al., "Introduction to Engineering Experimentation," 2nd Edition, 2004, Chapter 4, 10 pages, Pearson—Prentice-Hall, Upper Saddle River, NJ.

Affidavit of Christopher Butler dated Jan. 15, 2016 regarding "Rinton Press—Publisher in Science and Technology," 6 pages, [Archived on web.archive.org on Jan. 3, 2007] Can be Retrieved at <URL:https://web.archive.org/web/20070103234656/http://rintonspress.com/journals/jmmonline.html>.

Affidavit of Christopher Butler dated Jan. 25, 2016 regarding "SmartWing Intelligent Clubs," 46 Pages, [Archived on web.archive.org on Apr. 11, 2006] Can be Retrieved at <URL:https://web.archive.org/web/20060411113841/http://www.smartswinggolf.com/site/>.

Affidavit of Christopher Butler dated Feb. 19, 2016 regarding "Concept2: Training," 5 pages, [Archived on web.archive.org on Feb. 5, 2009] Can be Retrieved at <URL:http://web.archive.org/web/20090205092657/http://concept2.com/us/training/default.asp>.

Certified File History of U.S. Pat. No. 8,905,855, Feb. 2, 2016, 709 Pages.

Certified File History of U.S. Pat. No. 8,941,723, Feb. 2, 2016, 929 Pages.

File History of U.S. Pat. No. 8,903,521, 2015, 406 pages.

(56) References Cited

OTHER PUBLICATIONS

Certified File History of U.S. Pat. No. 8,944,928, Feb. 2, 2016, 647 Pages.
Certified File History of U.S. Pat. No. 9,039,527, Feb. 2, 2016, 1047 Pages.
Declaration of Dr. Steven M. Nesbit, U.S. Pat. No. 8,905,855, Feb. 24, 2016, 235 Pages.
Declaration of Dr. Steven M. Nesbit, U.S. Pat. No. 8,941,723, Feb. 24, 2016, 219 Pages.
Declaration of Dr. Steven M. Nesbit, U.S. Pat. No. 8,903,521, Feb. 24, 2016, 250 Pages.
Declaration of Dr. Steven M. Nesbit, U.S. Pat. No. 8,944,928, Feb. 24, 2016, 195 Pages.
Declaration of Dr. Steven M. Nesbit, U.S. Pat. No. 9,039,527, Feb. 24, 2016, 227 Pages.
Curriculum Vitae of Dr. Steven M. Nesbit, Feb. 24, 2016, 10 pages.
Claim Limitation Reference Nos. '855 Petition, Feb. 24, 2016, 6 pages.
Claim Limitation Reference Nos. '723 Petition, Feb. 24, 2016, 5 pages.
Claim Limitation Reference Nos. '521 Petition, Feb. 24, 2016, 4 pages.
Claim Limitation Reference Nos. '928 Petition, Feb. 24, 2016, 3 pages.
Claim Limitation Reference Nos. '527 Petition, Feb. 24, 2016, 4 pages.
PCT International Search Report and Written Opinion for PCT/US2016/016896, dated Jun. 20, 2016, 9 Pages.

* cited by examiner

DETECT SPORTS VIDEO HIGHLIGHTS BASED ON VOICE RECOGNITION

BACKGROUND

This invention relates generally to digital content processing and particularly to detecting highlights in sports videos using voice recognition of audio data associated with the sports videos.

Smart handheld devices, such as smart phones and tablet computers, have become increasingly popular. The increased availability and bandwidth of network access (for wired and wireless networks) have enabled more communication platforms for digital content consumption and sharing, such as recording sports videos by smart phones and sharing video highlights of sports videos on social networking platforms. A video highlight of a sports video is a portion of the sports video and represents a semantically important event captured in the sports video, e.g., a short video clip capturing goals or goal attempts in a soccer game video clip. Given the complex spatiotemporal nature of sports videos, it is timing consuming and technically challenging to efficiently locate and select video highlights from a long video clip. For example, a 90-minute long video clip of a soccer game may contain three highlights capturing the three goal events, each of which may only last for 10~20 seconds.

Some conventional solutions of video highlights detection rely on some domain knowledge, that are only suitable for specific types of sports, e.g., classifying sports videos into football or basketball prior to highlight detection. Alternatively, some existing solutions use image analysis techniques to detect highlights captured in a sports video, e.g., using color based visual features of the sports video to track players and tennis ball in tennis videos. However, given the complex spatiotemporal nature of sports videos and rich semantic information carried by audio data associated with sports videos, highlight detection based on visual cues without effectively making use of the audio data is hard to be efficient and effective.

SUMMARY

Embodiments of the invention provide a solution for detecting video highlights of a sports video based on voice patterns recognized in an audio stream associated with the sports video. A video highlight of a sports video is a portion of the sports video and represents a semantically important event captured in the sports video.

A computer-implemented method for detecting one or more video highlights of a sports video comprises steps of evaluating an audio stream associated with the sports video, e.g., the loudness and length of the loudness of the portions of the audio stream, and selecting video segments of the sports video based on the evaluation of the audio stream. Each selected video segment represents a video highlight candidate. The steps further comprise using a trained audio classification model to recognize the voice patterns in the audio stream associated with each selected video segment and based on the comparison of the recognized video patterns with a set of desired voice patterns, selecting one or more video segments as the video highlights of the sports video. The selected video highlights may be ranked and presented in a user friendly way for sharing on a social networking platform.

Another aspect provides a non-transitory computer-readable storage medium storing executable computer program instructions for detecting one or more video highlights of a sports video based on voice patterns recognized in an audio stream associated with the sports video as described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

A solution is provided to detect video highlights in sports videos using voice recognition of audio data associated with the sports videos. An audio based video highlight detection service of the solution analyzes the audio data associated with a sports video, identifies video segments of the sports video based on the analysis of the audio data and detects video highlights in the identified video segments. The detected video highlights are provided to users in a user friendly way for sharing on various social networking platforms, e.g., FACEBOOK™, TWITTER™, YOUTUBE™ and INSTAGRAM™.

Figure 1:
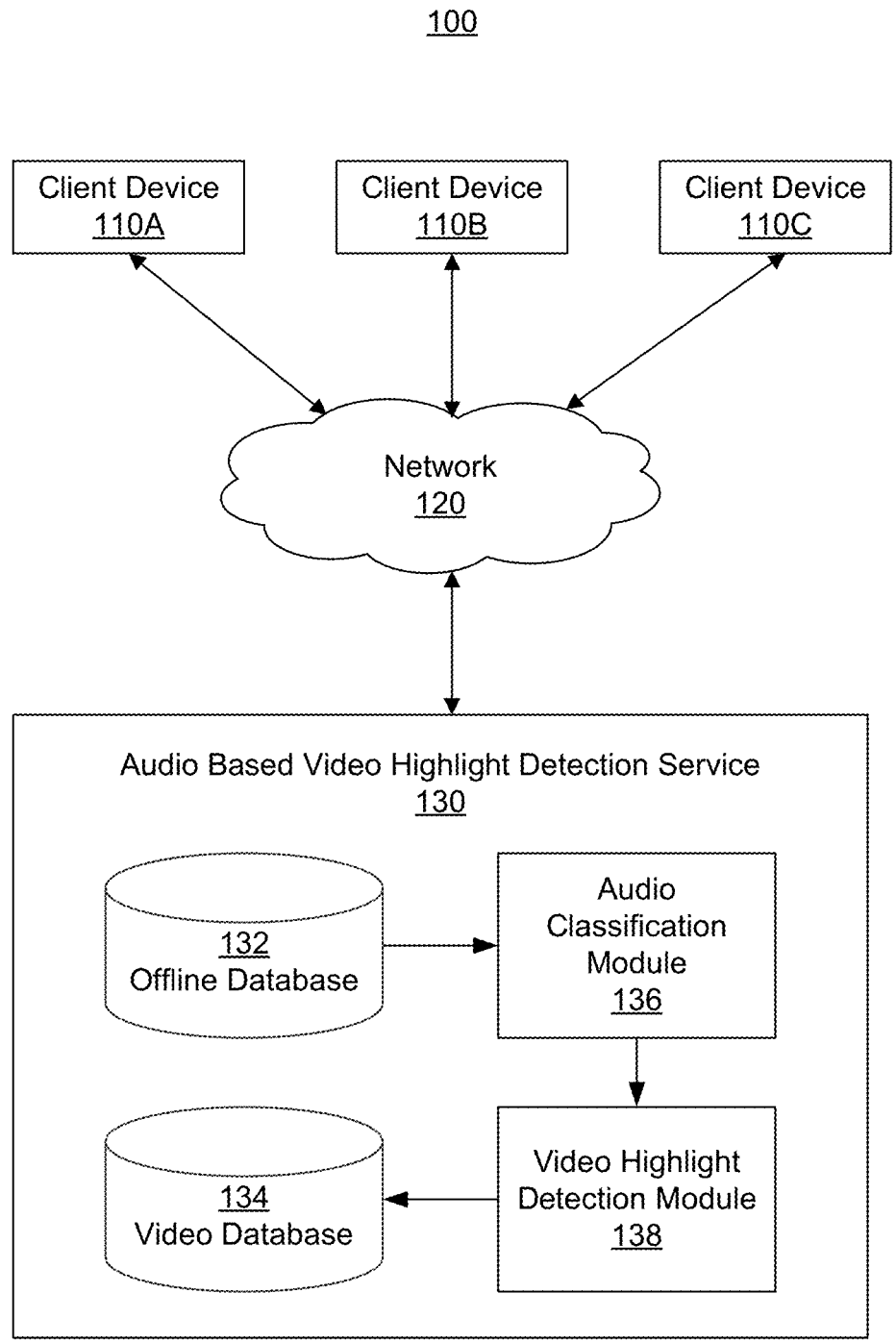
FIG. 1 is a block diagram of a computing environment for detecting video highlights in sports videos according to one embodiment.

FIG. 1 is a block diagram of a computing environment 100 for detecting video highlights in sports videos according to one embodiment. The embodiment illustrated in FIG. 1 includes multiple client devices 110 (e.g., 110A, 110B and 110C) and audio based video highlight detection service 130 connected to each other by a network 120. Embodiments of the computing environment 100 can have many client devices 110 and video highlight detection service 130 connected to the network 120. Likewise, the functions performed by the various entities of FIG. 1 may differ in different embodiments.

A client device 110 is an electronic device used by a user to perform functions such as recording a sports video, consuming digital content, executing software applications, browsing websites hosted by web servers on the network 120, downloading files, and the like. For example, the client device 110 may be a smart phone, or a tablet, notebook, or desktop computer. The client device 110 includes and/or interfaces with a display device on which the user may view videos and other content. In addition, the client device 110 provides a user interface (UI), such as physical and/or on-screen buttons, with which the user may interact with the client device 110 to perform functions such as viewing, selecting, and consuming digital content such as video highlights of sports videos.

The audio based video highlight detection service 130 illustrated in the embodiment of FIG. 1 includes an offline database 132 for storing a large video corpus of sports videos of various sports types, e.g., American football, soccer, table tennis/ping pong, tennis and basketball, a video database 134 for storing videos captured by the client devices 110, an audio classification module 136 and a video highlight detection module 138. Other embodiments of the audio based video highlight detection service 130 can have additional and/or different modules.

The audio classification module 136 trains an audio classification model using the sports videos stored in the offline database 132. The trained audio classification model classifies audio data, e.g., sound tracks, of sports videos into highlight audio data or non-highlight audio data. The audio data associated with a sports video carries useful semantic information indicating the importance of a particular play in the context of the entire sports game captured in the sports video. For example, loud crowd cheering, commentator's excitement and loud applauses are possible indicators of an exciting event during a sports game, e.g., a goal in a soccer game.

In one embodiment, the sports videos stored in the offline database 132 provide a training set for the audio classification module 136. Each sports video in the training set has at least one of predefined sound patterns, such as sounds for words of "Yeah", "Whoa", "Yes" and sounds for loud applauses. The sports videos in the training set are used as ground truth to learn one or more measurements for detecting video highlights in sports videos by the video highlight detection module 138.

In one embodiment, the audio classification module 136 extracts one or more audio features from the sound tracks of the sports videos stored in the offline database 132. Examples of the audio features extracted from the sound tracks include audio features in frequency domain, such as spectral features computed on the magnitude spectrum of the sound tracks, Mel-frequency cepstral coefficients (MFCC) of the sound tracks, spectral bandwidth and spectral flatness measure of the sound tracks, spectral fluctuation, extreme value frequencies, and silent frequencies of the sound tracks.

The audio features extracted from the sound tracks of the sports videos can also include audio features in temporal domain, such as the mean, standard deviation and the covariance matrix of feature vectors over a texture window of a sound track. Other embodiments of the audio classification module 136 may include additional and/or different audio features extracted from the sound tracks of the sports videos, such as volume changes of a sound track over a period of time and compression format of the sound track if the sound track is compressed.

The audio classification module 136 uses the extracted audio features of the sound tracks of the sports videos to train an audio classification model using one or more machine learning techniques. Machine learning techniques include, but are not limited to, neural networks, naïve Bayes, support vector machines and machine learning used in Hive frameworks. In one embodiment, from extracted audio features, the audio classification module 136 learns distinguishing features for each of the predefined sound patterns, such as sounds for words of "Yeah," "Whoa," "Yes" and sounds for loud applauses in the context of sports games. The audio classification module 136 provides the trained model to the video highlight detection module 138 to classify the audio data associated with a sports video captured by the client device 110 in real time.

The video highlight detection module 138 uses the trained audio classification model to analyze the sound track of a sports video. In one embodiment, a sports video has multiple video frames and a sound track associated with the sports video; a video segment corresponds to a portion of the sports video. The sound track associated with the sports video contains the sounds from the sports game itself, such as the sound of a ping pong ball hitting on the surface of a ping pong table in a ping pong game, sounds made by the players, excitement from a commentator and loud cheering from the audiences. The video highlight detection module 138 uses the trained audio classification model to classify the sounds of the sound track of a sports video into highlight sounds and non-highlight sounds. A highlight sound of the sound track of a sports video should correspond to a sound matching one or more of the predefined sound patterns, such as sounds for words of "Yeah," "Whoa," "Yes" and sounds for loud applauses in the context of sports games. A non-highlight sound of the sound track of a sports video represents a sound that does not match any of predefined sound patterns and thus has minimum significance to the video highlight detection, e.g., background noise of the sports video.

The video highlight detection module 138 selects one or more video segments from a sports video based on the analysis of the sound track associated with the sports video. A video segment associate with the identified highlight sound represents a potential video highlight of the sports video. For example, a selected video segment has at least one of desired audio features indicating that the selected video segment corresponds to a video highlight in the context of the entire sports video. The video highlight detection module 138 ranks multiple video highlights of the sports video and presents the video highlights to the client 110 for sharing on various social networking platforms. The details of the video highlight detection module 138 are further provided with reference to the description of FIG. 3 through FIG. 11.

Figure 2:
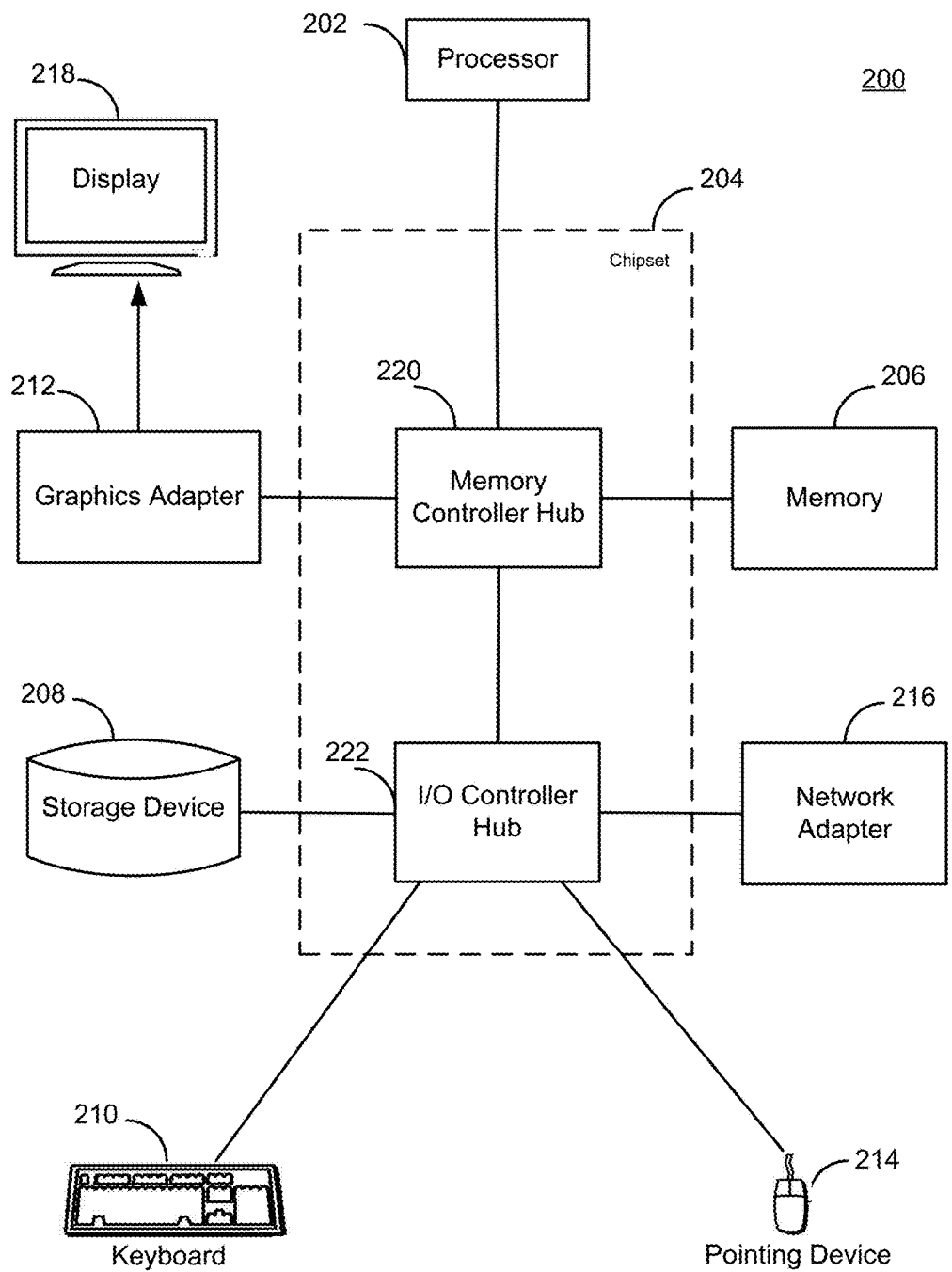
FIG. 2 is a block diagram illustrating an example of a computer for acting as a client device and/or a computer server to provide audio based video highlight detection service according to one embodiment.

The network 120 enables communications among the client devices 110 and the audio based video highlight detection service 130. In one embodiment, the network 120 comprises the Internet and uses standard communications technologies and/or protocols. In another embodiment, the entities can use custom and/or dedicated data communications technologies.
Computing System Architecture The entities shown in FIG. 1 are implemented using one or more computers. FIG. 2 is a high-level block diagram of a computer 200 for acting as the audio based video highlight detection service 130 and/or a client device 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, the computers acting as the audio based video highlight detection service 130 can be formed of multiple blade servers linked together into one or more distributed systems and lack components such as keyboards and displays. Moreover, the storage device 208 can be local and/or remote from the computer 200 (such as embodied within a storage area network (SAN)).

Figure 3:
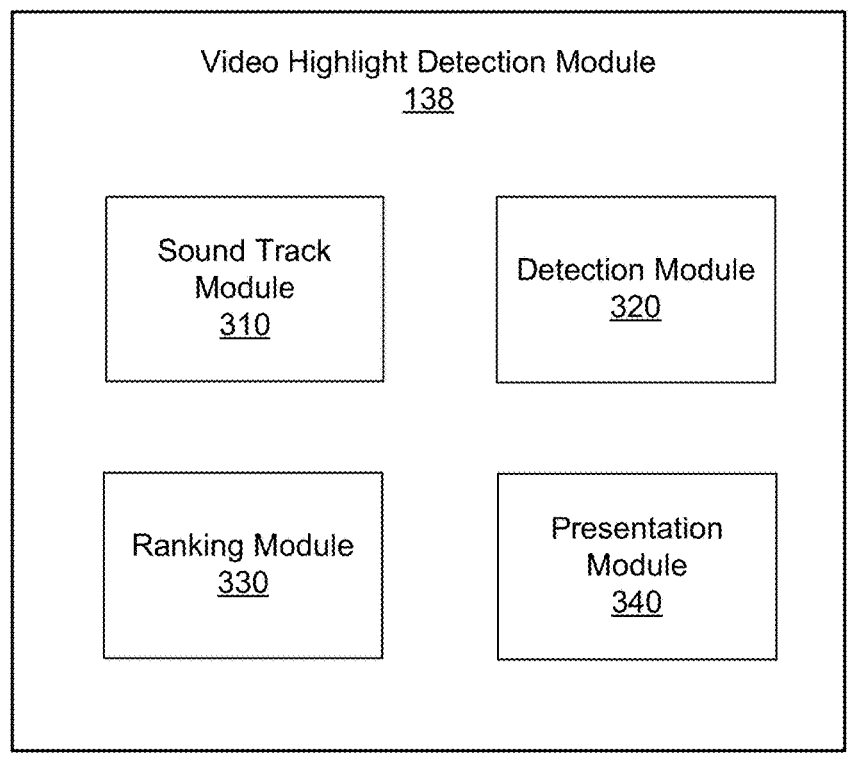
FIG. 3 is a block diagram of a video highlight detection module according to one embodiment.

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.
Audio Based Video Highlights Detection The video highlight detection module 138 uses a trained audio classification model to analyze the sound track of a sports video and selects one or more video highlights from the sports video based on the analysis of the sound track of the sports video. FIG. 3 is a block diagram of the video highlight detection module 138 according to one embodiment. In the embodiment shown in FIG. 3, the video highlight detection module 138 has a sound track module 310, a detection module 320, a ranking module 330 and a presentation module 340. Other embodiments of the video highlight detection module 138 may include additional and/or other entities. Likewise, the functions performed by the various entities of FIG. 3 may differ in different embodiments.

The sound track module 310 analyzes the sound track of a sports video and selects one or move video segments whose audio data has the desired audio features, e.g., loudness and length of the loudness. In one embodiment, the sound track module 310 measures the loudness of the sound track of the sports video in terms of the average power of the sound track and effective continuous power length of the sound track. It is noted that the human auditory system averages the effects of a sound pressure level over a 600-1000 ms interval, where the sound pressure level indicates the power of a sound. For example, a sound of constant sound pressure level is perceived to increase in loudness as samples of duration 20, 50, 100, and 200 ms are heard, up to a duration of about 1 second at which point the perception of loudness stabilizes.

In one embodiment, the sound track module 310 extracts an audio stream from the sports video, where the audio stream corresponds to the sound track of the sports video. The sound track module 310 down samples the audio signal of the sound track and applies a Fast Fourier Transform (FFT) to each processing unit (e.g., 1 second) of the audio signal to generate a spectral vector containing the magnitudes of the FFT coefficients every 1 second. The generated spectrum can be filtered by the sound track module 310 using a filter bank distributed based on the Mel scale. The following equation defines the Fast Fourier Transform of an audio signal in time domain:

$$X(k) = \sum_{j=1}^{N} x(j) e^{\frac{-2\pi i}{N}(j-1)(k-1)}$$

where k=0, . . . , N−1; x(j) is the sample at time index j within the processing unit (e.g. 1 second) and i is the imaginary number $\sqrt{-1}$. X(k) is a vector of N values at frequency index k corresponding to the magnitude of the sine waves resulting from the decomposition of the signal. The power spectrum of the signal within the processing unit, which is used as a measure for loudness, is defined as:

$$P = \sum_{k=0}^{N-1} |X(k)|^2$$

The sound track module 310 computes average power of the sound track for each processing unit (e.g., 1 second) of the audio signal of the sound track. The sound track module 310 compares the average power of the sound track of with a predefined sound power threshold N. Responsive to the average power of the corresponding sound track being greater than the threshold N, the sound track module 310 monitors the duration of the sound track. In response to the duration of the average power of the corresponding sound track lasting longer than a length threshold $T_{len}$, the sound track module 310 selects the video frames corresponding to the identified sound track. The selected video frames form a video segment, which represents a potential video highlight of the sports video.

Figure 5:
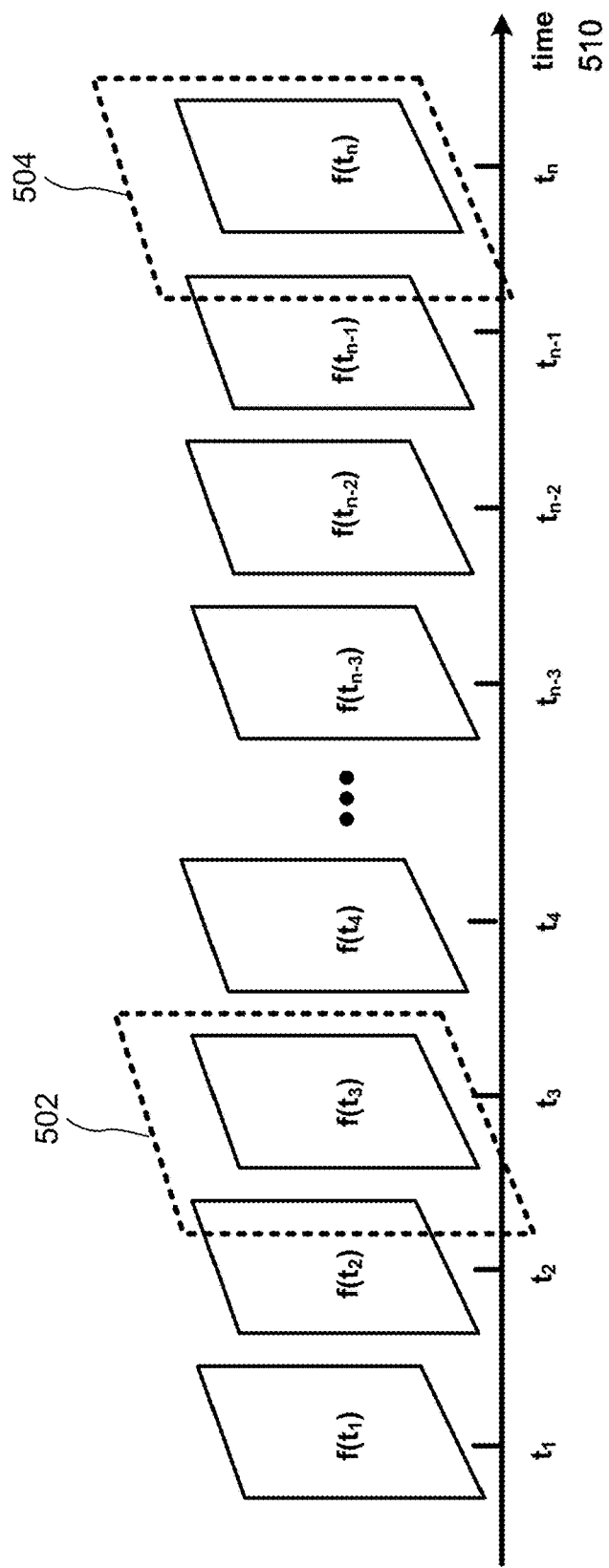
FIG. 5 is an example of a sports video having two video segments according to one embodiment.

Turning now to FIG. 5, FIG. 5 is an example of a sports video having two video segments based on analysis of the sound track of the sports video according to one embodiment. The sports video illustrated in FIG. 5 has a total number of n frames, i.e., $f_{(t_1)}$ to $f_{(t_n)}$; each video frame has a corresponding sound track (not shown in FIG. 5) and a time stamp, $t_i$, i=1, 2, 3, . . . , n. The sound track module 310 extracts the audio stream associated with the video frames and partition the audio stream into multiple processing units, e.g., one second. For each second of audio signal of the audio stream, the sound track module 310 performs Fast Fourier Transform (FFT) and computes the power as the loudness measure. Responsive to loudness of the audio signal being greater than the threshold N and its duration longer than the length threshold $T_{len}$, the sound track module 310 selects the corresponding video frames to form a video segment representing a potential video highlight. In the example illustrated in FIG. 5, the sound track module 310 selects two video segments, 502 and 504, as the video highlight candidates. The video segment 502 comprises a part of frame $f_{(t_2)}$ and entire frame $f_{(t_3)}$; the video segment 504 comprises a partial frame $f_{(t_{n-1})}$ and entire frame $f_{(t_n)}$.

The video segments selected based on the corresponding audio data analysis represent potential video highlights of a sports video. Given that the sound track associated with the sports video contains the sounds from the sports game itself, such as the sound of a ping pong ball hitting on the surface of a ping pong table in a ping pong game and sounds made by the players, the video highlight detection module 138 further analyzes the selected video segments to detect video highlights among the selected video segments. Each detected video highlight has at least one of voice patterns that are recognized by the trained audio classification model as the sound for a video highlight, such as sounds for words of "Yeah," "Whoa," "Yes" and sounds for loud applauses in the context of sports games.

Referring back to FIG. 3, the detection module 320 of the video highlight detection module 138 receives the video segments selected by the sound track module 310, applies the trained audio classification model to the audio data associated with the selected video segments and detects video highlights based on the analysis of the audio data. In one embodiment, the detection module 320 applies the trained audio classification model to the audio data of each selected video segment to recognize one or more voice patterns and compares the audio data with a series of predefined voice patterns. Based on the comparison with each predefined voice pattern, the detection module 320 generates three highlight parameters for each video segment: a similarity score, an effective sound length and maximum sound power. The detection module 320 analyzes the generated parameters and selects one or more video segments as the video highlights based on the analysis of the parameters.

Figure 4:
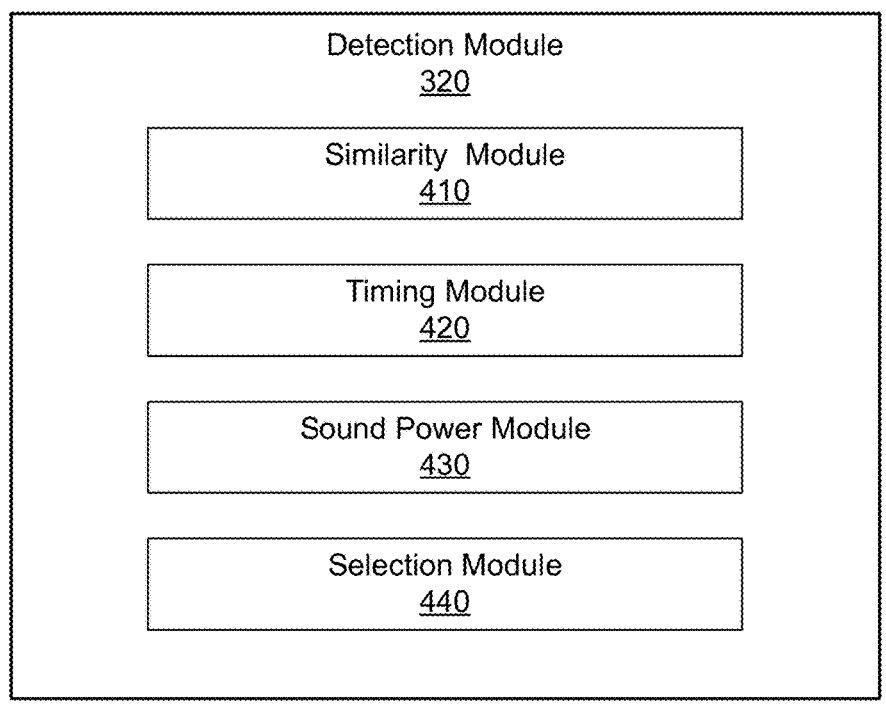
FIG. 4 is a block diagram of a detection module according to one embodiment.

FIG. 4 is a block diagram of the detection module 320 according to one embodiment. In the embodiment illustrated in FIG. 4, the detection module 320 has a similarity module 410, a timing module 420, a sound power module 430 and a selection module 440. The similarity module 410 calculates a similarity score between each voice pattern in a set of predefined voice patterns and the audio data associated with a video segment. In one embodiment, the set of predefined voice patterns includes voice patterns for the sounds of words of "Yeah," "Whoa," "Yes" and sounds for loud applauses in the context of sports games and each voice pattern has one or more audio features describing the sound. The similarity score is measured by the distance between the features of the audio of interest and the learned distinguishing features (by the audio classification module 136) of each predefined voice patterns. A larger distance indicates a larger similarity score. Thus, the similarity score between the audio data associated with a video segment and a predefined voice pattern represents a measurement of similarity between the audio features of the audio data of a sports video and the audio features of the predefined voice pattern.

The timing module 420 of the detection module 320 determines the effective length of each predefined voice pattern recognized in the audio data associated with a video segment. In one embodiment, the timing module 420 uses a timing window to measure the length of a predefined voice pattern recognized in the audio data associated with a video segment and the size of the timing window is represented by a number of seconds of a digital clock, e.g., 10 seconds. Other embodiments of the timing module 420 may use other alternatives to measure the length of the audio data. It is noted a short loud sound observed during a sports game may not be as reliable as a long loud sound to indicate the likelihood of a video segment as a video highlight of a sports video. The effective length of the predefined voice patterns recognized in the audio data associated with video segments can be used by the video highlight detection module 138 to rank video highlights of a sports video.

A video segment may last for some time, e.g., multiple timing windows, and the loudness of each predefined voice pattern recognized in the audio data associated with the video segment may vary during the different timing windows. The sound power module 430 selects the maximum loudness of the recognized voice patterns within any timing window applied to the audio data of the video segment. In one embodiment, the sound power module 430 computes an average power of each recognized voice pattern within each timing window applied to the audio data of a video segment and selects the recognized voice pattern that has the largest average power among multiple timing windows applied to the audio data of the video segment. The maximum loudness of the recognized voice patterns associated with video segments can be used by the video highlight detection module 138 to rank video highlights of a sports video.

The selection module 440 analyzes the highlight parameters associated with each video segment, e.g., the similarity score, the effective sound length and maximum of the sound power associated with the video segment, and select a video segment as a video highlight responsive to the highlight parameters satisfying one or more predefined conditions. In one embodiment, for each video segment, the selection module 440 compares the similarity score with respect to a voice pattern with a similarity threshold. The similarity threshold represents a minimum degree of similarity associated a recognized voice pattern for the video segment to be qualified as a video highlight. Responsive to none of the similarity scores with respect to each of the recognized voice patterns exceeding the similarity threshold, the video segment is not selected as a video highlight of the sports video. For example, if the audio data associated with a video segment is not similar to any of the sounds for words "Yeah," "Whoa," "Yes" and sounds for loud applauses, the video segment is not selected as a video highlight of the sports video. On the other hand, responsive to at least one similarity score with respect to a voice pattern exceeding the similarity threshold, the video segment is selected as a video highlight of the sports video.

To further illustrate the operations of the modules of the detection module 320, a set of predefined voice patterns is represented by a parameter set $\{S_j\}$, where $j \in [0, N)$ and N represents a total number of predefined voice patterns. For each video segment, $V_i$, the similarity module 410 calculates a similarity score $\theta_i^j$ with respect to each predefined voice pattern j. The timing module 420 measures the effective length of each recognized voice pattern of each video segment $V_i$ and selects the effective length of a recognized voice pattern with the longest duration to represent the effective sound length of the video segment by parameter $\tau_i^j$. Within each timing window applied to audio data of a video segment $V_i$, the sound power module 430 calculates an average sound power $P(V_i)$, and selects the largest sound power max ($P(V_i)$) among the average sound powers $P(V_i)$ associated with the predefined voice patterns recognized in the audio data of the video segment $V_i$ to represent the sound power of the video segment. The selection module 440 compares each similarity score $\theta_i^j$ with a similarity threshold value $\theta_s$, which represents the minimum similarity required for a video segment to be qualified as a video highlight. Responsive to each similarity score not exceeding the similarity threshold value, i.e., $\theta_i^j < \theta_s(S_j)$, the video segment is not selected as a video highlight of the sports video. The video segments selected as the video highlights by the selection module 440 are grouped into a new set $\theta\{V_i\}$.

Figure 6:
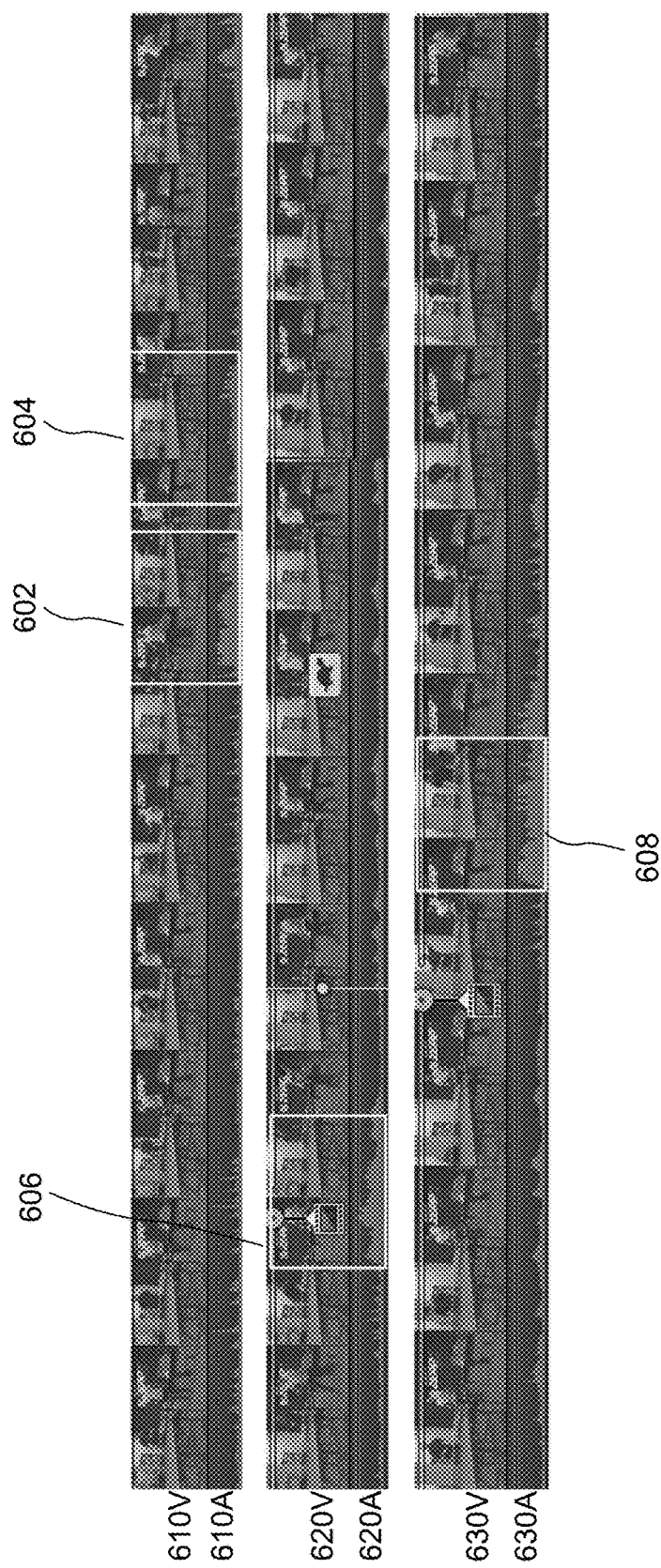
FIG. 6 is an example of a table tennis (also known as "ping pong") video that contains four video segments selected based on audio data analysis according to one embodiment.

FIG. 6 is an example of a ping pong video that contains four video segments selected based on audio data analysis according to one embodiment. For illustration purpose, the video frames of the ping pong video illustrated in FIG. 6 are presented in three rows, 610V, 620V and 630V, each of which has multiple video frames. Each video frame of the ping pong video has corresponding audio data. For example, for the video frames in row 610V, the associated audio data are shown in row 610A in terms of audio frequencies. Similarly, the corresponding audio data associated with the video frames in row 620V are shown in row 620A; the corresponding audio data associated with the video frames in row 630V are shown in row 630A.

The sound track module 310 analyzes the audio data associated with the video frames (shown in 610V, 620V and 630V) and selects four video segments, 602, 604, 606 and 608, based on the audio data analysis. Each of the selected video segments has one or more video frames, and the average power of the audio data of each selected video segment is greater than the predefined sound power threshold N and the length of the audio data of a selected video segment is larger than a threshold $T_{len}$. Each of the four selected video segments, 602, 604, 606 and 608, represents a potential video highlight of the ping pong game video.

The detection module 320 further analyzes the video segments selected by the sound track module 310 and determines which video segment qualifies for a video highlight. In one embodiment, the detection module 320 generates a similarity score between a predefined voice pattern and the audio data associated with the video segment. For example, a set of predefined voice patterns include sounds for words "Yeah," "Whoa," "Yes" and sounds for loud applauses. The detection module 320 generates four similarity scores for a video segment, each of which is associated with a voice pattern in the set of predefined voice patterns. Responsive to at least one of the similarity scores for the video segment exceeding a similarity threshold, the detection module 320 selects the video segment as a video highlight. The detection module 320 also computes the length of the audio data and maximum sound power of the audio data for a video segment qualified as a video highlight for further processing.

Figure 7:
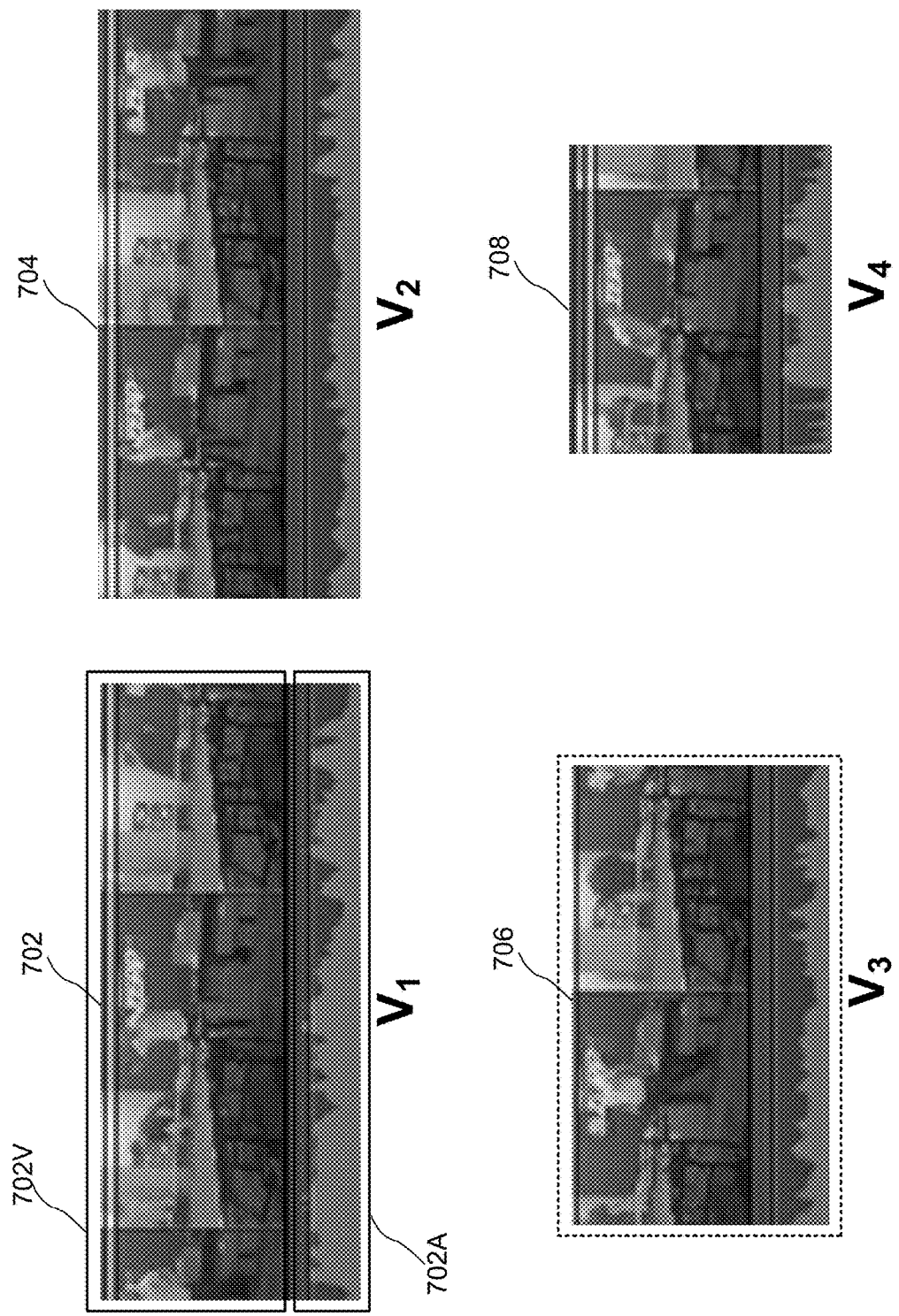
FIG. 7 shows exemplary video highlights selected from the video segments of the ping pong video illustrated in FIG. 6 according to one embodiment.

FIG. 7 shows exemplary video highlights selected from the video segments of the ping pong video illustrated in FIG. 6 according to one embodiment. Among the four video segments selected by the sound track module 310, the detection module 320 selects the video segment 702, video segment 704 and video segment 708 as the video highlights of the ping pong video based on the similarity scores associated with each selected video segment. Each selected video highlight has one or more video frames and corresponding audio data. Taking video highlight 702 as an example, the video highlight 702 has one or more video frames 702V and corresponding audio data 702A. The video segment 706 is not selected because the audio data associated with the video segment 706 does not have sounds similar to at least one of the predefined voice patterns associated with special events in the context of sports games, e.g., loud cheering using words "Yeah," "Whoa," "Yes" or loud applauses.

A sports video may contain more than one video highlight. To present the video highlights in a user friendly way, the video highlight detection module 138 may rank the multiple video highlights of a sports video and presents the video highlights in an order according to the ranking of the video highlights. Referring back to FIG. 3, the video highlight detection module 138 has a ranking module 330 to rank multiple video highlights associated with a sports video. In one embodiment, the ranking module 330 ranks the video highlights by normalizing the highlight parameters associated with the video highlights and ordering the video highlights based on the sum of the normalized highlight parameters associated with each video highlight.

In one embodiment, the ranking module 330 normalizes the similarity scores associated with the video highlights of a sports video. Assuming that the video highlights of a sports video are represented by $\theta\{V_i\}$ and that the similarity scores of a video highlight $V_i$ of the sports video with respect to a set of predefined voice patterns $\{S_i\}$ are represented by $\theta_i^j$, the ranking module 330 normalizes the similarity scores $\theta_i^j$ for all the predefined voice patterns in the set $\{S_i\}$ to generate the normalized similarity scores, Normal($\theta_i^j$). Among the normalized similarity scores for the video highlights, the ranking module 330 selects the maximum value as a final similarity score $\emptyset(V_i)$, where $\emptyset(V_i)$=max(Normal($\theta_i^j$)). The ranking module 330 applies a predefined weight factor $\mu_1$ to the final similarity score $\emptyset(V_i)$ as in Equation (1) below to generate the normalized similarity scores for the rest of the video highlights of the sports video $\theta\{V_i\}$:

$$\eta_1(V_i) = \mu_1 * \frac{\emptyset(V_i)}{\max(\emptyset(V_i))} \quad (1)$$

The ranking module 330 normalizes the effective sound length associated with the video highlights of a sports video. Assuming that the effective sound length of video highlight $V_i$ is represented by parameter $\tau_i^j$, the ranking module 330 applies a predefined weight factor $\mu_2$ to the effective sound length $\tau_i^j$ associated with the video highlight $V_i$ as in Equation (2) below to generate the normalized effective sound length for the rest of the video highlights of the sports video $\theta\{V_i\}$:

$$\eta_2(V_i) = \mu_2 * \frac{\tau_i^j}{\max(\tau_i^j)} \quad (2)$$

The ranking module 330 further normalizes the sound power associated with the video highlights of a sports video. Assuming that the sound power of video highlight $V_i$ is represented by parameter $P(V_i)$, the ranking module 330 applies a predefined weight factor $\mu_3$ to the sound power $P(V_i)$ associated with the video highlight $V_i$ as in Equation (3) below to generate the normalized sound power for the rest of the video highlights of the sports video $\theta\{V_i\}$:

$$\eta_3(V_i) = \mu_3 * \frac{P(V_i)}{\max(P(V_i))}, \quad (3)$$

The ranking module 330 computes a sum of the normalized highlight parameters associated with each video highlight of a sports video as in Equation (4) below:

$$\text{Sum}(V_i) = \Sigma_{k=1}^{k=3} \eta_k(V_i) \quad (4)$$

where $V_i \in \theta\{V_i\}$. The ranking module 330 orders the video highlights based on the sum of the normalized highlight parameters associated with each video highlight.

Referring back to the examples illustrated in FIG. 7, the sound track module 310 selects four video segments, V1 (702), V2 (704), V3 (706) and V4 (708), based on the average sound power and sound length of the audio data associated with the four video segments. The detection module 320 selects video segment V1, V2 and V4 as the video highlights of the ping pong video. The ranking module 330 ranks the video highlights according to the ordering based on the normalized highlight parameters described above, e.g., V2, V4 and V1 according the ranking order.

The presentation module 340 of the video highlight detection module 138 presents the video highlights of a sports video to users of the audio based video highlight detection service 130 in a user friendly way. In one embodiment, the presentation module 340 presents the video highlights of a sports video in a graphical user interface on a display of the client 110 of a user. The graphical user interface has a display area to show a selected video highlight, a manual selection tool to select a video highlight, a display area to display thumbnail images of multiple portions of the sports video. A user is able to preview a video highlight, select a theme and logo for a video highlight and share the video highlights with others on various social networking platforms.

Figure 9:
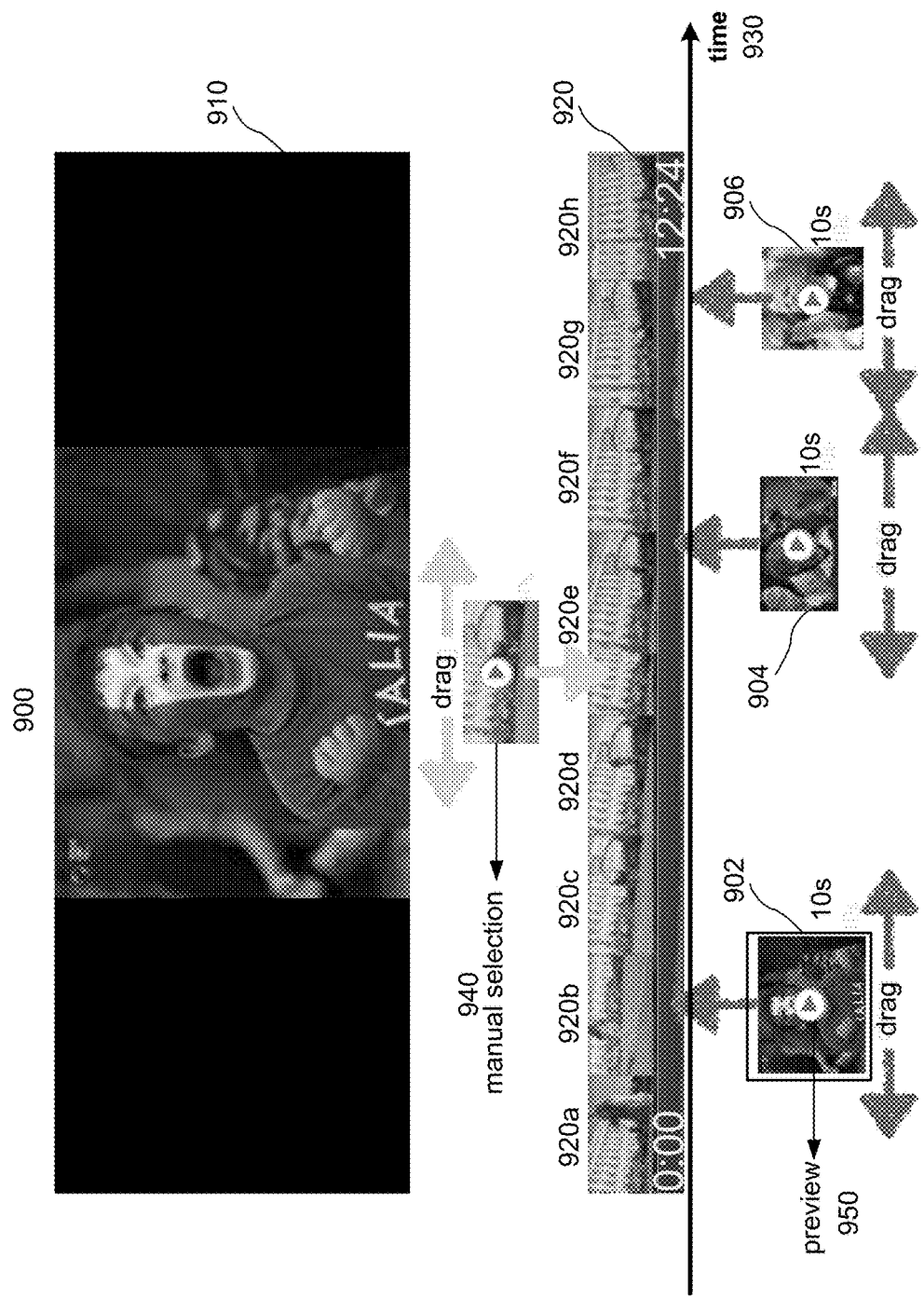
FIG. 9 is an exemplary graphical user interface to present video highlights selected from a sports video according to one embodiment.

FIG. 9 is an exemplary graphical user interface 900 to present video highlights selected from a sports video according to one embodiment. The sports video 920 is presented with multiple thumbnail images 920a-920h representing various portions of the sports video 920. The timing information of the sports video 920 is shown with a timing line 930. A user can manually select a portion of the sports video for playback by clicking a thumbnail image, e.g., 920a. In the example illustrated in FIG. 9, the sports video 920 has three video highlights, 902, 904 and 906, each of which lasts for 10 seconds. A user can preview the video highlights before selecting one video highlight for display. The video highlight 902 is currently selected and displayed in a display area 910.

Figure 10:
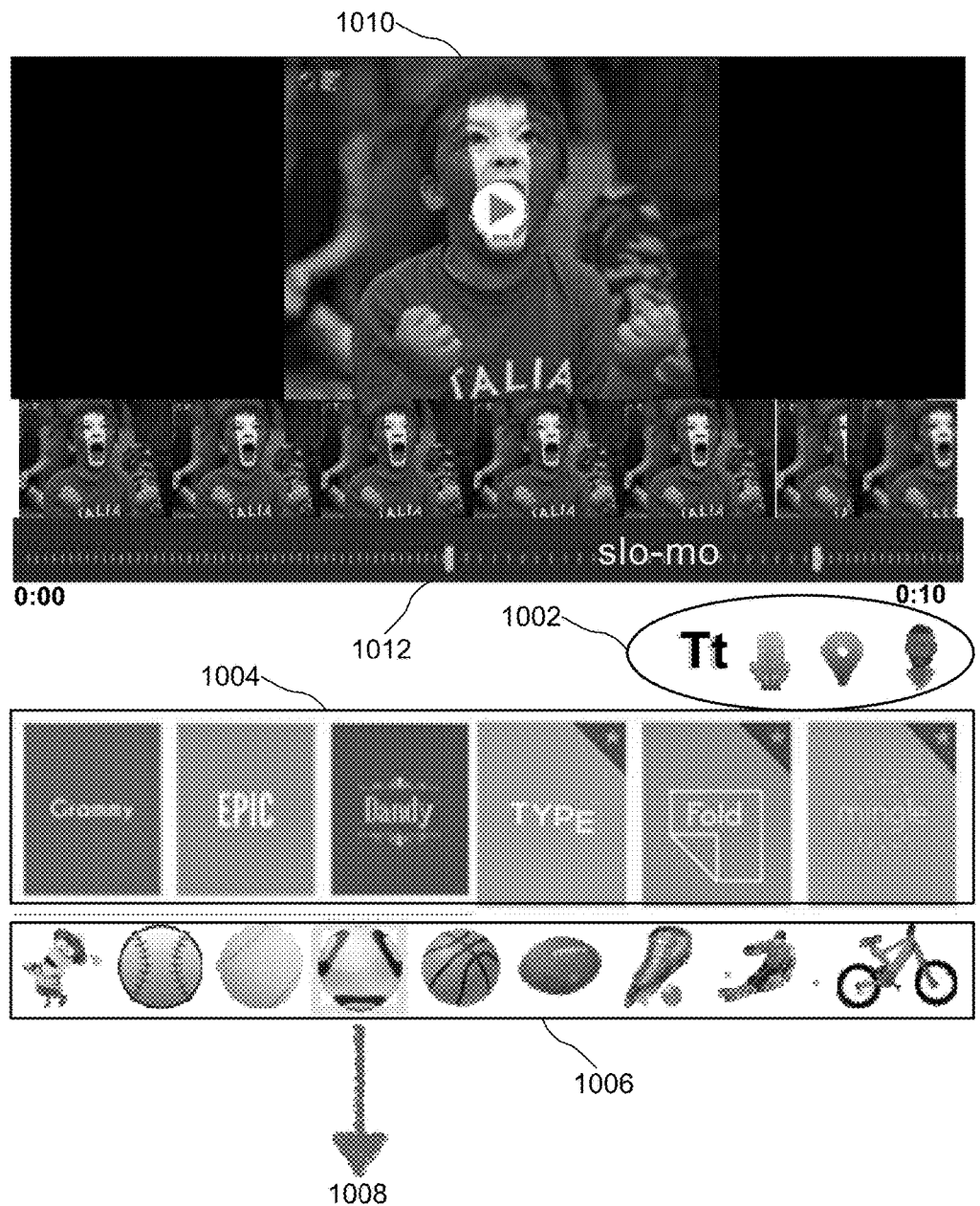
FIG. 10 is an exemplary graphical user interface to provide user control of presenting video highlights of a sports video according to one embodiment.

In addition to present the video highlights of a sports video friendly, the presentation module 340 also provides tools for users to customize the look-and-feel of the video highlights. FIG. 10 is an exemplary graphical user interface to provide user control of presenting video highlights of a sports video according to one embodiment. For example, a video highlight 1010 can be presented in a slow motion mode 1012. A user can control the look-and-feel of a video highlight by selecting a theme from a list of available themes 1004. For different types of sports, e.g., baseball, soccer, skiing, etc., a user can select a symbol, e.g., the symbol 1008 to represent a soccer game, from a list of sports symbols 1006. For a video highlight to be presented on a display of a user's client, e.g., smart phone, the user can adjust the text format, volume, view focus and player of interest from the corresponding tools 1002 provided by the presentation module 340.

Figure 11:
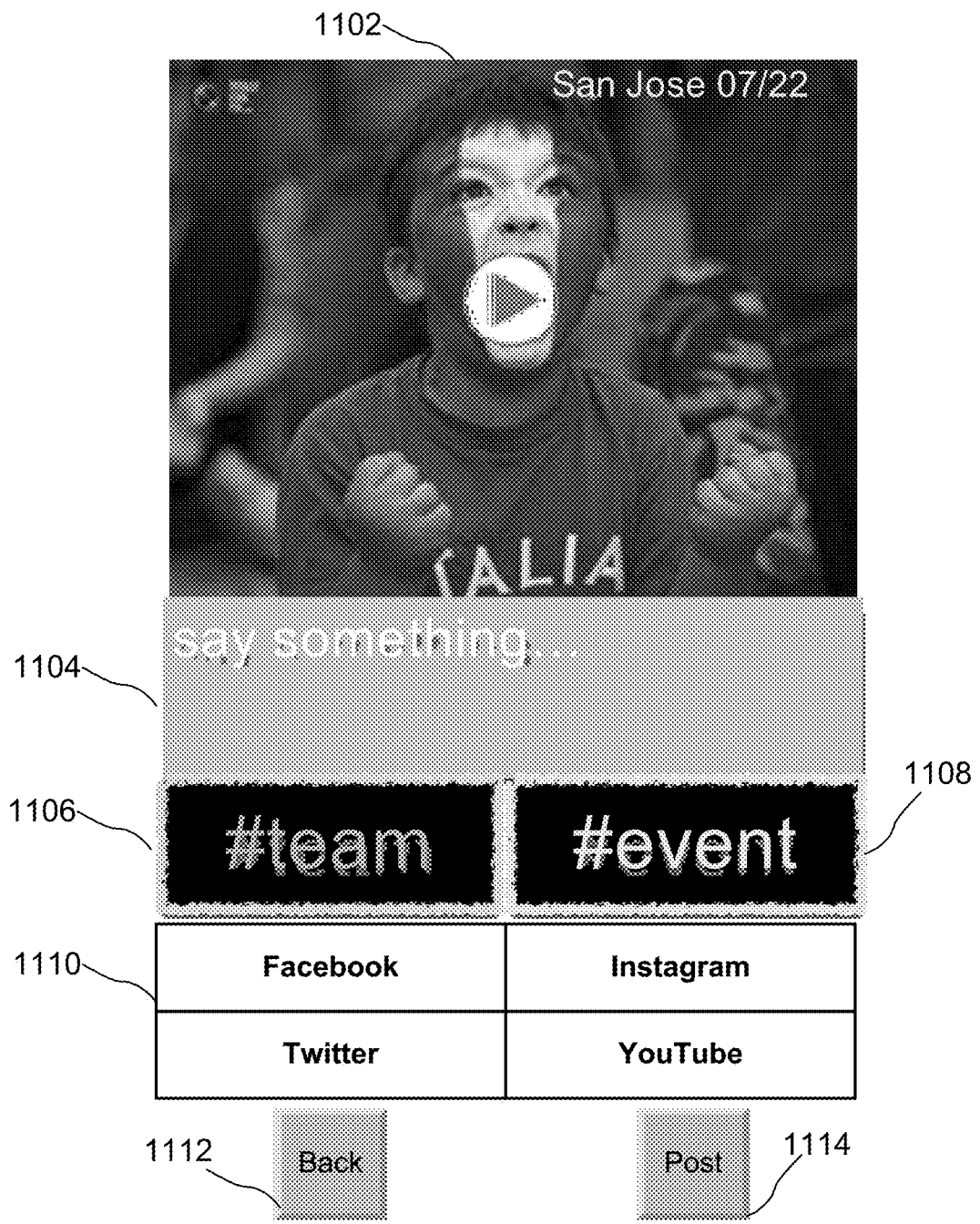
FIG. 11 is an exemplary user interface for sharing video highlights of a sports video over various social networking platforms according to one embodiment.

The presentation module 340 of the video highlight detection module 138 also presents links to various social networking platforms for users to share video highlights of a sports video. FIG. 11 is an exemplary user interface for sharing video highlights of a sports video over various social networking platforms according to one embodiment. The video highlight 1102 to be shared is currently displayed in a display area. A user may choose to add some voice comments 1104 and choose which details associated with the video highlight 1102 to be shared, e.g., team 1006 or event 1108. The presentation module 340 provides a link 1110 to each of the social networking platforms supported by the audio based video highlight detection service 130, e.g., FACEBOOK™, INSTAGRAM™, TWITTER™ and YOUTUBE™. Once a user is ready to share the video highlight 1102 on a selected social platform, the user clicks a "post" button 1114 to post the video highlight 1102 and its associated information; the user also has an option to go back (e.g., button 1112) to a previous configuration stage, e.g., the examples illustrated in FIG. 10 and FIG. 11 to adjust the presentation details.

Figure 8:
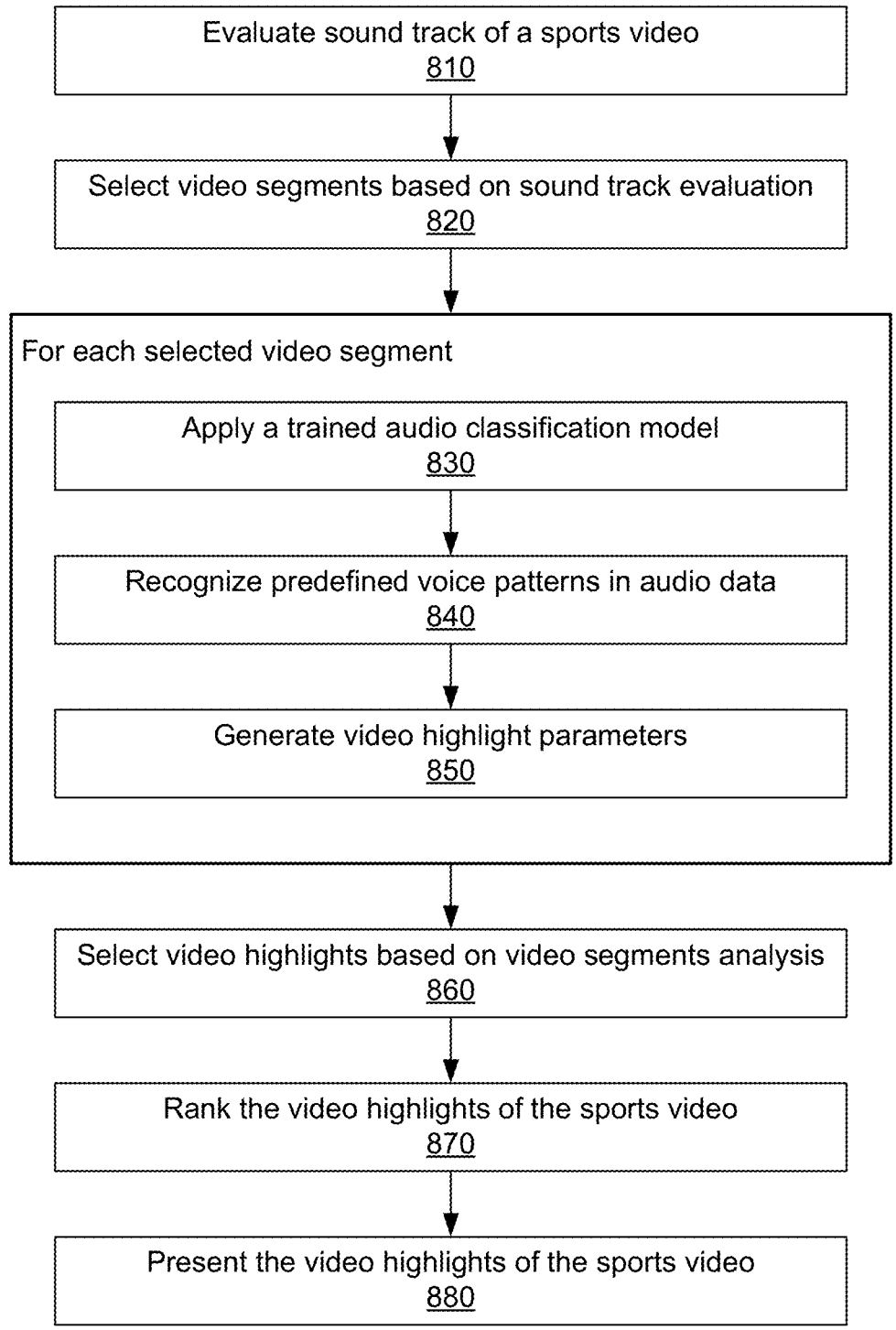
FIG. 8 is an exemplary flowchart illustrating a process for detecting video highlights in a sports video according to one embodiment.

FIG. 8 is an exemplary flowchart illustrating a process for detecting video highlights in a sports video according to one embodiment. Initially, the video highlight detection module 138 of the audio based video highlight detection service 130 as illustrated in FIG. 1 extracts the sound track of a sports video and evaluates 810 the sound track based on the average sound power of the sound track and length of the sound track with the desired sound power. Based on the sound track evaluation, the video highlight detection module 138 selects 820 one or more video segments as potential video highlights of the sports video.

For each selected video segment, the video highlight detection module 138 applies 830 a trained audio classification model to the audio data associated with the video segment. The application of the trained audio classification model enables the video highlight detection module 138 to recognize 840 one or more predefined voice patterns, such as the sounds for words "Yeah," "Whoa," "Yes" and sounds for loud applauses, in the sports video. For each video segment, the video highlight detection module 138 generates 850 multiple video highlight parameters, e.g., a similarity score, effective sound length and sound power, with respect to each recognized voice pattern.

The video highlight detection module 138 selects 860 one or more video segments as the video highlights of the sports video based on the analysis of the video highlight parameters associated with a video segment. For example, responsive to the similarity score of a video segment with respect to at least one recognized voice pattern exceeding a predefined similarity threshold, the video highlight detection module 138 selects the video segment as a video highlight of the sports video. The video highlight detection module 138 further ranks 870 the video highlights of the sports video by, e.g., normalizing the similarity scores, effective sound length and sound power with respect to all recognized voice patterns. The video highlight detection module 138 presents 880 the video highlights in a user friendly way, such as illustrated in FIGS. 9-11.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for detecting highlights in a sports video comprising:
    evaluating an audio stream associated with the sports video;
    selecting one or more video segments of the sports video based on the audio stream evaluation;
    wherein a video segment corresponds to a portion of the sports video, and wherein selecting one or more video segments based on the audio stream evaluation comprises:
    selecting a video segment responsive to the portion of the audio stream associated with the video segment having desired audio features; wherein a portion of the audio stream having the desired audio features has average sound power larger than a predefined loudness threshold and length of the average sound power lasts longer than a predefined length threshold;
    recognizing a plurality of voice patterns in each selected video segment by:
        applying a trained sound classification model to a plurality of portions of the audio stream associated with the video segment using stored sports videos; and
        generating a plurality of highlight parameters with respect to a set of predefined voice patterns based on the application of the trained sound classification model, each of the predefined voice patterns representing a desired audio feature associated with a highlight of the sports video comprising:
            generating a similarity score between audio features of the portion of the audio stream associated with audio features of the video segment and each voice pattern of the set of predefined voice patterns;
        generating an effective sound length of the video segment; and
        generating maximum sound power of the video segment;
        wherein generate maximum sound power of the video segment comprises:
    within each of a plurality of timing windows of a video segment associated with a voice pattern recognized in the audio stream, calculating an average power sound, and selecting a largest sound power among the calculated average power sounds; and
    detecting one or more highlights in the sports video based on the generated plurality of highlight parameters associated with the plurality of voice patterns of the selected video segments.

2. The method of claim 1, wherein evaluating the audio stream associated with the sports video comprises: determining loudness of the audio stream over a predetermined period of time; and determining effective sound power length of the loudness of the audio stream.

3. The method of claim 2, wherein determining the loudness of the audio stream comprises: computing average power of the audio stream over the predetermine period of time.

4. The method of claim 2, further comprising: comparing the loudness of the audio stream with a predefined loudness threshold; and comparing the effective sound power length of the loudness with a predefined length threshold.

5. The method of claim 1, wherein a selected video segment represents a highlight candidate for the sports video.

6. The method of claim 1, wherein recognizing a plurality of voice patterns in each selected video segment further comprises: analyzing the generated the plurality of highlight parameters.

7. The method of claim 1, wherein the set of predefined voice patterns comprise at least one of the following: a voice pattern for the sound of word "Yeah"; a voice pattern for the sound of word "Whoa"; a voice pattern for the sound of word "Yes"; and a voice pattern for loud applauses in the context of sports videos.

8. The method of claim 1, further comprising: selecting the video segment responsive to a similarity score associated with the video segment exceeding a similarity score threshold, the similarity score threshold representing a minimum degree of similarity for the video segment to be qualified as a highlight of the sports video.

9. The method of claim 1, wherein detecting one or more highlights in the sports video based on the generated plurality of highlight parameters associated with the plurality of voice patterns of the selected video segments comprise: selecting a video segment having audio features similar to at least one of desired voice patterns, wherein the similarity between the audio features of the video segment and the audio features of the desired voice patterns is presented by similarity scores between the audio features of the video segment and each of the desired voice patterns.

10. The method of claim 1, further comprising: ranking the detected highlights of the sports video; and presenting the detected highlights of the sports video in a graphical user interface for sharing the detected highlights of the sports video in a social networking platform.

11. The method of claim 10, wherein ranking the detected highlights of the sports video comprises: normalizing highlight parameters associated with the detected highlights, the highlight parameters being generated based on the voice patterns recognized in the detected highlights; and ordering the detected highlights based on the normalized highlight parameters associated with the detected highlights of the sports video.

12. A non-transitory computer readable storage medium storing executable computer program instructions for detecting highlights in a sports video, the instructions when executed by a computer processor cause the computer processor to: evaluate an audio stream associated with the sports video; select one or more video segments of the sports video based on the audio stream evaluation; wherein a video segment corresponds to a portion of the sports video, and wherein the instructions for selecting one or more video segments based on the audio stream evaluation comprise instructions when executed by the computer process that cause the computer processor to: select a video segment responsive to the portion of the audio stream associated with the video segment having desired audio features; wherein a portion of the audio stream having the desired audio features has average sound power larger than a predefined loudness threshold and length of the average sound power lasts longer than a predefined length threshold;
  recognize a plurality of voice patterns in each selected video segment by: applying a trained sound classification model to a plurality of portions of the audio stream associated with the video segment using stored sports videos; and generating a plurality of highlight parameters with respect to a set of predefined voice patterns based on the application of the trained sound classification model, each of the predefined voice patterns representing a desired audio feature associated with a highlight of the sports video comprising: generating a similarity score between audio features of the portion of the audio stream associated with audio features of the video segment and each voice pattern of the set of predefined voice patterns: generating an effective sound length of the video segment: and generating maximum sound power of the video segment; wherein generate maximum sound power of the video segment comprises: within each of a plurality of timing windows of a video segment associated with a voice pattern recognized in the audio stream, calculating an average power sound, and selecting a largest sound power among the calculated average power sounds; and detect one or more highlights in the sports video based on the generated plurality of highlight parameters associated with the plurality of voice patterns of the selected video segments.

13. The computer readable storage medium of claim 12, wherein the instructions for evaluating the audio stream associated with the sports video comprise instructions when executed by the computer processor that cause the computer processor to: determine loudness of the audio stream over a predetermined period of time; and determine effective sound power length of the loudness of the audio stream.

14. The computer readable storage medium of claim 13, wherein the instructions for determining the loudness of the audio stream comprise instructions when executed by the computer processor that cause the computer processor to: compute average power of the audio stream over the pre-determine period of time.

15. The computer readable storage medium of claim 13, further comprising instructions when executed by the computer processor that cause the computer processor to: compare the loudness of the audio stream with a predefined loudness threshold; and compare the effective sound power length of the loudness with a predefined length threshold.

16. The computer readable storage medium of claim 12, wherein a selected video segment represents a highlight candidate for the sports video.

17. The computer readable storage medium of claim 12, wherein the instructions for recognizing a plurality of voice patterns in each selected video segment further cause the computer processor to: analyze the generated the plurality of highlight parameters.

18. The computer readable storage medium of claim 12, wherein the set of predefined voice patterns comprise at least one of the following: a voice pattern for the sound of word "Yeah"; a voice pattern for the sound of word "Whoa"; a voice pattern for the sound of word "Yes"; and a voice pattern for loud applauses in the context of sports videos.

19. The computer readable storage medium of claim 12, further comprising instructions when executed by the computer process that cause the computer processor to: select the video segment responsive to a similarity score associated with the video segment exceeding a similarity score threshold, the similarity score threshold representing a minimum degree of similarity for the video segment to be qualified as a highlight of the sports video.

20. The computer readable storage medium of claim 12, wherein the instructions for detecting one or more highlights in the sports video based on generated plurality of highlight parameters associated with the plurality of voice patterns of the selected video segments comprise instructions when executed by the computer process that cause the computer processor to: select a video segment having audio features similar to at least one of desired voice patterns, wherein the similarity between the audio features of the video segment and the audio features of the desired voice patterns is presented by similarity scores between the audio features of the video segment and each of the desired voice patterns.

21. The computer readable storage medium of claim 12, further comprising instructions when executed by the computer process that cause the computer processor to: rank the detected highlights of the sports video; and present the detected highlights of the sports video in a graphical user interface for sharing the detected highlights of the sports video in a social networking platform.

22. The computer readable storage medium of claim 21, wherein the instructions for ranking the detected highlights of the sports video comprise instructions when executed by the computer process that cause the computer processor to: normalize highlight parameters associated with the detected highlights, the highlight parameters being generated based on the voice patterns recognized in the detected highlights;

and order the detected highlights based on the normalized highlight parameters associated with the detected highlights of the sports video.

\* \* \* \* \*